(12) United States Patent
Holmes et al.

(10) Patent No.: US 10,069,760 B2
(45) Date of Patent: Sep. 4, 2018

(54) METHOD FOR PROVISIONING A CUSTOMIZED CLOUD STACK

(71) Applicant: Deutsche Telekom AG, Bonn (DE)

(72) Inventors: Ta'id Holmes, Maintal (DE); Robert Schwegler, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 345 days.

(21) Appl. No.: 14/830,317

(22) Filed: Aug. 19, 2015

(65) Prior Publication Data

US 2016/0065499 A1  Mar. 3, 2016

(30) Foreign Application Priority Data

Aug. 27, 2014 (EP) ..................................... 14002964

(51) Int. Cl.
*G06F 15/173* (2006.01)
*H04L 12/911* (2013.01)
(Continued)

(52) U.S. Cl.
CPC .......... *H04L 47/827* (2013.01); *G06F 3/0665* (2013.01); *G06F 9/5072* (2013.01); *H04L 47/785* (2013.01); *H04L 67/02* (2013.01)

(58) Field of Classification Search
CPC ..... H04L 47/827; G06F 3/0665; G06F 9/5072
(Continued)

(56) References Cited

U.S. PATENT DOCUMENTS 8,983,987 B2 * 3/2015 Ravi ................. G06F 17/30554
707/758
2012/0185913 A1  7/2012 Martinez
(Continued)

OTHER PUBLICATIONS

Ferry Nicolas et al: "Towards Model-Driven Provisioning ,Deployment, Monitoring, and Adaptation of Multi-cloud Systems", 2013 IEEE Sixth International Conference on Cloud.
(Continued)

*Primary Examiner* — Vivek Srivastava
*Assistant Examiner* — Atta Khan
(74) *Attorney, Agent, or Firm* — Shlesinger, Arkwright & Garvey LLP

(57) ABSTRACT

Method for an automatic provisioning of a customized cloud stack comprising a customized infrastructure of servers, software and services, by using a number of domain specific languages, model-to-model transformations and code generators, wherein a first domain specific language is used to define a model of software and services to be provisioned on particular hosting units that are defined by a user, wherein the hosting units are mapped to a general model of the infrastructure of the customized cloud stack by an execution engine; and wherein the general model is generated by a second domain specific language, transformed by the execution engine and mapped to a model conforming to a metamodel of a third domain specific language which is used to provision the infrastructure according to the particular hosting units defined by the first domain specific language; wherein files for initialization of a particular server within the infrastructure of servers are generated by particular code generators according to the model defined by the third domain specific language and weaved into userdata for specifying particular software and services, wherein the userdata are passed when particular servers are started and wherein particular code generators are used to produce consumers of services generated by the third domain specific language for provisioning the infrastructure of the customized cloud stack as specified in respective hosting units.

9 Claims, 10 Drawing Sheets

(51) Int. Cl.
*G06F 3/06* (2006.01)
*G06F 9/50* (2006.01)
*H04L 12/915* (2013.01)
*H04L 29/08* (2006.01)

(58) Field of Classification Search
USPC .......................................................... 709/226
See application file for complete search history.

(56) References Cited

U.S. PATENT DOCUMENTS

| | | | |
|---|---|---|---|
| 2012/0271874 A1* | 10/2012 | Nugent | H04L 41/5045 709/201 |
| 2014/0074973 A1 | 3/2014 | Kumar | |
| 2014/0075032 A1* | 3/2014 | Vasudevan | H04L 41/50 709/226 |

OTHER PUBLICATIONS

Computing, IEEE, Jun. 28, 2013, pp. 887-894, XP032567280, DOI: 10.1109/CLOUD.2013.133.

* cited by examiner

```
31 ──▶ IaaSProject:
35 ──── 'IaaS project'
        name=ID
37 ──── (description=Description)?
        'costCenter' costCenter=STRING
39 ──── 'createdBy' createdBy=STRING
        'members' '('
            (members+=Member)+
        ')'
41 ──── ('securityGroups' '('
            (groups+=SecurityGroup)+
        ')')? &
43 ──── ('volumes' '('
            (volumes+=Volume)+
        ')')? &
        'servers' '('
            (servers+=Server)+
45 ──── ')'
        ;

33 ──▶ SecurityGroup:
        name=ID
        (description=Description)? '('
            (rules+=FWRule)*
        ')'
47 ──── ;
        FWRule:
        proto=Protocol
49 ──── 'src' '('
            ('net' src=STRING) |
            ('group' group=[SecurityGroup])
        )
51 ──── ('dst' ports+=Ports
            (',' ports+=Ports)*
        )?
        ;
        Ports:
        min=INT ('-' max=INT)?
        ;

Fig. 3
```

```
###############################################
# create keys
###############################################
«IF model.project.members.filter[it.publicKey != null].size > 0»
«FOR member : model.project.members.filter[it.publicKey != null]»
KEYNAME="«member.name.split('@').get(0).replace('.', '_')»"
KEYFILE="$KEYNAME.pub"
echo "«member.publicKey»" > $KEYFILE
nova keypair-add --pub_key $KEYFILE $KEYNAME
«ENDFOR»
«ENDIF»

###############################################
# create security groups
###############################################
«FOR group : model.project.groups»
nova secgroup-create «group.name» \
«IF group.description != null»'«group.description.name»'«ELSE»«group.name»«ENDIF»
«FOR rule : group.rules»
    «FOR ports : rule.ports»
    «IF rule.group != null»
nova secgroup-add-group-rule «group.name» «rule.proto.literal.toLowerCase()» \
«ports.min» «IF ports.max != 0»«ports.max»«ELSE»«ports.min»«ENDIF» \
«group.name» «rule.group.name»
    «ELSE»
nova secgroup-add-rule «group.name» «rule.proto.literal.toLowerCase()» \
«ports.min» «IF ports.max != 0»«ports.max»«ELSE»«ports.min»«ENDIF» \
«rule.src»
    «ENDIF»
    «ENDFOR»
«ENDFOR»
«ENDFOR»
```

Fig. 4

```
W7 urInfrastructure project
MDE_at_DTAG ("MDE@DTAG")
costCenter "123456789"
members {
    "t.holmes@telekom.de"
}
createdBy "t.holmes@telekom.de"
defaults {
    flavor urServer_Medium
    image precise
}
securityGroup CfS {
    TCP src net "10.1.0.0/16"
    ICMP src net "0.0.0.0/0"
    TCP src net "0.0.0.0/0" dst 22,80,443
    server web
        flavor urServer_Small
        backup
        mount "/usr/local/home" 32 GB
        mount "/www" 8 GB
        mount "/backup" 64 GB zfs
            snapshot daily
}
securityGroup RfS {
    TCP src group CfS dst 80,443
    server c1
        mount "/usr/local/home" 32 GB
    server app
        mount "/www" 16 GB
}
```

Fig. 5

```
EnvironmentProject:
    'W7 urEnvironment project' name=ID
    (description=Description)?
    'costCenter' costCenter=STRING
    'members' '{'
        (members+=Member)+
    '}'
    'createdBy' createdBy=[urInfrastructure::Member|STRING]
    'profile' profile=[Profile]
    (hostingUnits+=HostingUnit)+
;
HostingUnit:
    'hostingUnit' name=ID ('flavor' size=TShirtSize)?
    (autoscale?='scale' min=INT ('-' max=INT)?)?
    ('stage' (stages+=Stage)+)?
    (services+=Service)+
;
Service:
    (internal?='internal')? 'service' type=[ServiceType]
    ('stage' (stages+=Stage)+)?
;
```

Fig. 6

```
EnvironmentGlobals:
    'W7' urEnvironment 'globals'
    (clouds+=Cloud)*
    (profiles+=Profile)*
    (serviceTypes+=ServiceType)+
;
profile:
    'profile' name=ID
    (description=Description)?
    'stages' (stages+=Stage)+
;
Stage:
    name=ID
    (description=Description)?
    ('@' cloud=[Cloud])?
;

ServiceType:
    'serviceType' name=ID
    (description=Description)?
    ('ports' ports+=ServicePorts)*
    ('implies' (services+=Service)+)?
;
ServicePorts:
    proto=Protocol
    ports+=Ports (',' ports+=Ports)*
;
```

Fig. 7

```
def create target : UrInfrastructureFactory::eINSTANCE.createSecurityGroup
    transform(Stage stage, Iterable<HostingUnit> units) {
  target.name = stage.name
  for (unit : units.filter[stages.empty || stages.contains(stage)]) {
    // first calculate all (transitive) services
    var services = resolveServices(
      unit.services.filter[stages.empty || stages.contains(stage)]
    )
    // open the ports for not internal services
    for (service : services.filter[! internal]) {
      //println('creating rules for service ' + service.type.name)
      for (ports : service.type.ports) {
        //println('\t' + ports.transform)
        target.rules += ports.transform
      }
    }
    if (! services.empty) {
      target.servers += unit.transform(services)
    } else {
      println("ignoring host '" + unit.name + "'; "
        + " does not contain services in stage " + stage.name
    }
  }
}
```

Fig. 8

```
W7 urEnvironment project —81
  M2M_PoC
  costCenter "123456789"
  members {
    "t.holmes@telekom.de"
    "r.schwegler@telekom.de"
  }
  createdBy "t.holmes@telekom.de"
  profile ThreeStage    89
  hostingUnit sensor flavor S
83┘                stage DEV TEST
       87─┐ service PoC_part1
          89┘
  hostingUnit broker flavor S
          service Mosquitto
91─hostingUnit converter flavor S
          service PoC_part2
93─hostingUnit analytics flavor S
          service PoC_part3
95─hostingUnit db
          service PostgreSQL
  hostingUnit www
          service ApacheWSGI
  97┘     service PoC_part4
```

```
W7 urEnvironment globals
  profile ThreeStage
    stages DEV ("development")
           TEST ("test")
           PROD ("production")
    serviceType Apache implies
        service Web
    serviceType ApacheWSGI implies
        service Apache
    serviceType Mosquitto implies
        service MQTT
    serviceType MosquittoClient implies
        service PyXB
    serviceType MQTT
        ports TCP 1883,8883
    serviceType PostgreSQL
        ports TCP 5432
    serviceType PoC_part1 implies
        service MosquittoClient
    serviceType PoC_part2 implies
        service MosquittoClient
    serviceType PoC_part3 implies
        service MosquittoClient
        service SQLAlchemy
    serviceType PoC_part4 implies
        service SQLAlchemy
        service PyXB
    serviceType Web
        ports TCP 80,443
```

METHOD FOR PROVISIONING A CUSTOMIZED CLOUD STACK

BACKGROUND OF THE INVENTION

Cloud computing enables enterprises to deal with rapidly changing demands of computational power. Based on hardware infrastructure that is hosted by a third party, more or less computational power can be used with no need to update an expensive and static server farm using cloud computing.

A cloud is traditionally known as a virtual storage, wherein cloud computing comprises the provisioning of a complete working environment in terms of a cloud stack consisting of hardware, software and particular services that are defined by a particular user.

Since cloud computing enables a dynamic adaption of cloud stacks, i.e. a dynamic change of resources that are provided by a cloud poster, i.e. cloud provider, resources that are currently needed have to be specified and particular cloud stacks have to be defined by a user, which is time consuming and expensive.

SUMMARY OF THE INVENTION

Against this background, a method for an automatic provisioning of a customized cloud stack comprising a customized infrastructure of servers, software and services by using a number of domain specific languages, model-to-model transformations and code generators is provided. Thereby, a first domain specific language is used to define a model of software and services to be provisioned on particular hosting units that are defined by a user, wherein the hosting units are mapped to a general model of the infrastructure of the customized cloud stack by an execution engine; and wherein the general model is generated by a second domain specific language, transformed by the execution engine and mapped to a model conforming to a meta-model of a third domain specific language which is used to provision the infrastructure according to the particular hosting units defined by the first domain specific language; and wherein files for initialization of a particular server within the infrastructure of servers are generated by code generators according to the model defined by the third domain specific language and weaved into userdata for specifying particular software and services, wherein the userdata are passed when particular servers are started and wherein code generators are used to produce consumers of services generated by the third domain specific language for provisioning the infrastructure of the customized cloud stack as specified in respective hosting units.

Within the context of the present invention, the term "hosting unit" specifies a hardware entity of software and services that is required by a particular user.

Within the context of the present invention, the term "service consumers" or "consumers of services" specifies a client, particularly an infrastructure as a service (IaaS) client, that receives data from a particular domain specific language and that is used for provisioning a particular cloud stack. Thus, service consumers are particularly programs that use services or APIs of an infrastructure as a service provider for definition of security groups and security rules, for example.

A domain specific language is a computer language that is not abstract but rather concrete, such that commands within a particular domain specific language are directly linked to a specific function, which enables a very simple programming of desired functions.

The present method is based on domain specific languages comprising grammars and model transformations that are used to specify hosting units and services which are mapped to a particular infrastructure in order to permit non-experts to specify a customized cloud stack. Relying on and interacting with configuration management software, provisioning details for the services is specified exogenously. A respective provisioning of processes is generated from scripts of particular domain specific languages and performed fully automatically. Thus, a transitive closure of services contained in a hosting unit is calculated and a mapping to server instances is performed. For services that are not labeled as internal, enabling security rules are generated for respective ports. A configuration management in terms of a Puppet master, for example, hosts particular modules for services and deploys as well as distributes a particular configuration and software to particular server instances.

A cloud hoster, i.e. an infrastructure as a service (IaaS) provider of a cloud-computer network, offers a number of services to its users, such as storage, computing and networking. Based on the services provided by the cloud hoster, services, such as platform as a service (PaaS) and software as a service (SaaS) can be performed on the IaaS.

Based on services provided by a platform hoster and a software hoster, particular employees of a user just have to log in their particular workspace via an internet connection and start working.

Since traditionally infrastructure as a service (IaaS), platform as a service (PaaS) and software as a service (SaaS) are handled independently, service consumers, i.e. clients, are constrained to some degree, as properties of lower cloud services are aggregated. Further, a file system, its redundancy and distribution usually cannot be controlled by a SaaS provider as it falls into a responsibility of an IaaS provider. Thus, in an industrial context, a lack of control over lower-level cloud service properties may hinder an adaption of cloud-based development and operation.

According to the present invention, the third domain specific language produces userdata that is passed to servers during their starting procedure. Thus, userdata can be used to configure clients such as a Puppet client, for example. For provisioning the services as specified in DSL programs, either all information that is necessary for a provisioning of particular services have to be passed as userdata or the information has to be realized by using Puppet software.

Puppet is a state of the art software that enables an automatic configuration of client server instances according to a master server.

In the case that all information that is necessary for a provisioning of particular services has been passed as userdata, the userdata are handled by the first domain specific language, wherein the third domain specific language generates a minimum of userdata for an optional Puppet client. During a starting procedure of an infrastructure as a service (IaaS) client, userdata that has been handled by the first domain specific language and generated by the third domain specific language are passed to a particular server.

When using Puppet, the third domain specific language is used for generating userdata for a starting procedure of a particular server instance. The userdata are used to install, configure and start a Puppet client on the particular server instance. The Puppet client joins the Puppet master and retrieves therefrom particular Puppet modules which are provided for the respective server instance and which are used for the provisioning of particular services.

In accordance with the invention, the present method is based on domain specific languages (DSL) which are used for describing customized cloud stacks enabling a provisioning of a particular infrastructure as a service (IaaS) that is provided with particular software and services that are needed by a particular enterprise in an automatic way.

To provide an individualized cloud stack, i.e. a cloud stack that fits to current needs of a particular user in an automatic way, the present method is based on specifications provided by the user in the first domain specific language. These specifications are used to create the individualized cloud stack by calculating an amount of resources, i.e. hardware and software that is needed to satisfy the user's needs.

The present method is based on a bottom up approach for engineering the domain specific languages. For this reason, the third domain specific language simply reflects infrastructure as a service (IaaS) concepts and is closely related to respective application programming interfaces (APIs) through code generators. The second DSL still focuses on infrastructure but abstracts for some concepts and builds on conventions and leaves out details. As a result, the second DSL eases a specification of an infrastructure as a service (IaaS). Compared to the third DSL, when used, the second DSL produces more compact code. As a consequence, the second DSL also reduces a chance for errors.

Code produced from the second DSL is parsed and mapped through model-to-model transformation to a platform specific model.

Finally, code generators produce respective service consumers for provisioning a demanded infrastructure as specified in the code produced by the second DSL. Moreover, a third high-level DSL permits specifications of customized cloud stacks. Thus, first, a model created by using the first DSL is mapped to a general infrastructure as a service (IaaS) model created by the second DSL and transformed via a platform specific metamodel, created by the third DSL, to respective infrastructure as a service (IaaS) clients that realize the provisioning of the particular customized clouds stack.

In the context of the present invention the term "customized cloud stack" specifies a platform or a software as a service (IaaS) or a service topology, based on a specific infrastructure as a service (IaaS), which provides an on demand infrastructure and which provides software and services that are installed, configured and integrated in the platform.

The third domain specific language can be used to define an infrastructure as a service (IaaS) project. To this, grammar rules are used, which may comprise security groups, volumes and servers, wherein a security group may comprise firewall rules that state protocols such as TCP, a source and one or more destination ports or port ranges. For the source either another security group needs to be referenced or a classless inter-domain routing (CIDR) address has to be specified. Grammar rules for volumes and servers are defined similarly. The grammar rules of the third domain specific language may comprise further rules and capture concepts such as images, flavors, CPU, RAM, and disk.

Further, the third domain specific language closely reflects platform specific concepts and is, as a consequence, rather platform specific. In particular, the third DSL constitutes a target metamodel for higher-level DSLs, such as the first or second DSL.

Clients using an infrastructure as a service (IaaS) APIs naturally form a target of an execution engine. Because the third DSL is tightly bound to particular APIs, an infrastructure as a service (IaaS) client can easily be generated through a model-to-text transformation, i.e. by using code generators. Besides a shellscript using Euca2ools, also a shellscript using an open stack compute client may be used.

The second DSL lists some defaults that apply to server definitions, such as default, flavor or image. These concepts are directly used from the first DSL through language referencing using an Xtext import statement, for example. The second DSL defines security groups with respective firewall rules and aggregates servers. On the one hand, aggregation of servers in security groups is a constraint compared to an EC2 model where servers are associated with one or more security groups. On the other hand, the aggregation of servers simplifies configuration for the DSLs by a user, presumed that a server only needs to "reside" within a security group. Further, the second DSL is used to specify a webserver that specifies a flavor and, thus, overwrites a defined default. In contrast to the mentioned EC2 model, volumes do not have to be defined explicitly and attached to a server.

In the second DSL, volumes are defined implicitly using mount statements. An advantage of this approach in the second DSL is that a block device can be formatted and mounted into a file system viewing provisioning. In addition, an offside backup strategy may be specified using duplicity behind the scenes. All of these small features can be activated with a few DSL keywords and parameters and made effective due to a realized automation while following best practices.

The first DSL focuses on specifying customized cloud stacks. The main idea is to not only state infrastructure but also software and services. That is, an entire cloud service stack shall be specified using the first DSL. In order to build on established configuration management solutions as well as not to pollute the DSL with technical aspects of a particular deployment, the first DSL is based on a model-driven approach.

Yet, the first DSL is complete so that modeling is not blocked by other activities lowering a barrier to obtain at least some cloud servers such as a particular infrastructure. Further, security groups with all their technical details are abstracted from the first DSL as much as possible. In addition, various stages of an engineering life cycle such as development, test and production shall be considered in the first DSL.

Services may be grouped in hosting units that reference previously defined services such as software as a service (SaaS) or relate to general services such as platform as a service (PaaS). Services may depend on other services forming a service stack.

The third DSL is meant to provision infrastructure similarly for particular stages. Thus, the third DSL ensures that a cloud stack for testing or preproduction may be provisioned equally as for production. An overall tool chain based on the third DSL may comprise the following parts: Besides parsing the second DSL and their subsequent transformation, cloud-init files are weaved into userdata which is passed when launching servers. This weaving takes place when a cloud-init file is available for a service as specified in a particular project.

For further provisioning, Puppet may be used. Puppet is preferred over cloud-init for the configuration management and provisioning making it only necessary to supply a single cloud-init file with a Puppet directive for configuring a Puppet agent. Similarly to cloud-init files, Puppet modules are included into manifest files of respective servers when a name of a service matches.

While the third DSL is complete, the present method may rely on Puppet experts for providing respective models realizing separation of concerns. That is, a conceptual part can be expressed using the third DSL and technical details for provisioning are supplied separately. In particular, Puppet modules can be developed prior or subsequently to the second DSL and made available to other projects through a common repository.

The described DSLs are easy to write, compact and intuitive. Differences between versions of outcomes of a particular DSL are easily recognized by users when using a version control system. The present method can build on different IaaS providers and can be applied in various contexts. It might be necessary to adapt a particular code generator to make use of respective APIs or clients.

The present method may be used for diverse scenarios having different contexts. Besides innovation projects, the present method may be applied also in prototyping scenarios and when testing a minimal viable product.

Furthermore, the present method can help to analyze cloud stacks and support substitution of services, either mockups or implementation.

According to an embodiment of the present method, an additional management server acts as a Puppet master for servers defined in the infrastructure of the customized cloud stack.

By using Puppet software, a number of servers can be initialized and configured automatically by running a Puppet client on particular client server instances. A server that acts as a Puppet master provides configuration commands that can be loaded from the Puppet master by the client server instances. In the case that a client server instance loads a configuration set, the client server instance calculates differences between its current configuration and the configuration of the Puppet master and changes its configuration, i.e. its software and services according to the Puppet master. Thus, if a configuration of the Puppet master is defined by using the present method, respective configurations of further servers or server instances can be performed automatically based on the Puppet master.

According to another aspect of the present method, a model is mapped to the general model and transformed to a respective infrastructure service client, wherein the infrastructure service client realizes a provisioning of the infrastructure of the customized cloud stack.

An infrastructure client can be used for provisioning the infrastructure of a particular cloud stack. Thus, the infrastructure client has to be based on specifications of the user. Further, the infrastructure client is generated automatically and can be used to control particular servers such that they are configured, e.g. by using Puppet as mentioned above.

According to another aspect of the present method, an additional customized cloud stack for testing or preproducting is provisioned.

For testing or preproducting changes that might be performed on a particular cloud stack, another, i.e. a second cloud stack can be provisioned to e.g. a developer such that particular changes can be tested without any risk for the respective running of the first cloud stack.

According to another aspect of the present inventive method, the transformations are model-to-model and/or model-to-text transformations.

To shift information gathered by a particular domain specific language or its respective model into another model of another domain specific language or to extract the information into text and to use it directly for specification of a particular cloud stack, for example, transformations can be used that shift the information into a particular grammar of a target, i.e. target model.

According to another aspect of the present method, the general model comprises information about particular stages, servers and services that are to be used.

Since the user specifies needed software and services in the first domain specific language and the output of this specification is mapped to the general model generated by the second domain specific language, the general model reflects the demands of the user, namely software and services. Based on the software, services and stages specified by the user, an amount of servers that are needed for provisioning a respective cloud stack can be calculated in the general model.

According to another aspect of the present method, default concepts defined in the metamodel are imported by the general model, wherein the default concepts are used to define security groups with respective firewall rules and to aggregate servers.

A metamodel is used to define grammar rules for a particular model generated by a particular domain specific language.

Since security of cloud stacks has to be guaranteed by a cloud poster, particular servers have to be protected against attacks from outside by using firewalls, for example. For communication between particular servers of a particular cloud stack such as for configuration aspects, for example, particular firewalls have to be configured to enable communication of all servers of the particular cloud stack automatically. Thus, the general model is used to define security groups wherein servers are allowed to communicate with each other according to default concepts. The default concepts, such as communication protocols or ports to be used, can be changed according to commands of the user in the first domain specific language.

According to another aspect of the present method, the third domain specific language specifies at least one parameter of the following list of server parameters for a particular cloud stack: size of harddisk, size of random access memory, amount of processing units and number of servers.

The third domain specific language is used to provision the cloud stack that is needed by the user. Thus, the third domain specific language specifies the resources of the cloud stack such as hardware and/or software.

According to another aspect of the present method, the first and/or the third domain specific language produce output, such as userdata that is used to specify a particular cloud stack.

It is possible that output of the first and/or the second and/or the third domain specific language can be used directly to specify settings of a particular cloud stack. Thus, output can be generated of any domain specific language using code generators, for example, that is not mapped or transformed but used directly to specify particular settings of the particular cloud stack.

For an automatic provision of a cloud stack, the user only has to provide information about profiles, i.e. workspaces and hosting units, that are specified by software and services needed by the user.

Optionally, the user may specify further parameters such as cost centers, members, or other parameters related to software and services needed by the user.

Based on the input of the user via the first domain specific language, a model is created with respect to a metamodel according to the third domain specific language. Based on security groups specified by the user, a model is created via the third domain specific language with respect to a metamodel according to the first domain specific language. Using metamodels of particular domain specific languages, a model of user input can be transformed into service clients for provisioning of software and services according to the user input.

The third domain specific language further generates cloud-init files for each server of a particular server and/or a client program that can be used for provisioning the third domain specific language on a particular server via a respective provider according to the cloud-init files. By provisioning the cloud-init files on a particular server, a Puppet program can be started which configures the particular server according to the Puppet master.

The present method is based on domain specific languages that each implicitly define a metamodel. Via a model-to-model transformer of programs generated by the first domain specific language, the programs are transformed into a model that is concordant to a metamodel of the second domain specific language. In a further step, the model of the second domain specific language is transformed into a final model that is also concordant to the model of the first domain specific language using the third domain specific language. Finally, the final model is used for generation of an infrastructure as a service (IaaS) client. During this procedure, userdata are generated that are merged during a starting procedure of the infrastructure as a service (IaaS) client and passed for starting a particular server, based on the third DSL.

Further, the present invention relates to a server farm comprising a number of servers, wherein a part of the number of servers is prepared with software and services and provisioned as a customized cloud stack to a user according to the present method.

The present server farm can be used to perform the present method, particularly.

The present server farm is based on a number of servers that can be used to provide a number of cloud stacks that again can be used to provide a number of workspaces with a specific amount of software and services. Based on the present method, the provision of the number of cloud stacks and the respective workspaces can be performed automatically based on a very small input of a user.

Further features and implementations will become apparent from the description and the accompanying drawings.

It will be understood that the features mentioned above and those described hereinafter can be used not only in the combination specified but can also be combined in other constellations or used on their own, without departing from the scope and the spirit of the present disclosure.

Implementations are schematically illustrated in the drawings by way of example and are hereinafter explained in detail with reference to the drawings. It is understood that the description is in no way limiting on the scope of the present disclosure and is merely an illustration of various implementations.

The details of one or more implementations are set forth in the accompanying drawings and the description below. Other features will be apparent from the description and drawings, and from the claims.

BRIEF DESCRIPTION OF THE DRAWINGS

FIG. 3 shows an example of grammar rules for a domain specific language as proposed by a further embodiment of a method according to the present invention.

FIG. 4 shows an example of a generator for a shell script used for provisioning of software and services according to an embodiment of the present invention.

FIG. 5 shows an example of a script using the second domain specific language according to a further embodiment of the present invention.

FIG. 6 shows an example of rules expressed using the first domain specific language for a project as specified by an embodiment of the present invention.

FIG. 7 shows an example of grammar rules expressed using the first domain specific language for definitions as specified by an embodiment of the present invention.

FIG. 8 shows an example of a structure of mapping stages to security groups through an Xtend Create Extension according to an embodiment of the present invention.

FIG. 9 shows an example of scripts expressed in the first domain specific language according to a further embodiment of the present invention in order to improve the machine-to-machine scenario shown in FIG. 1.

FIG. 10 shows a model transformation according to an embodiment of the present invention.

DETAILED DESCRIPTION OF THE INVENTION

Figure 1:
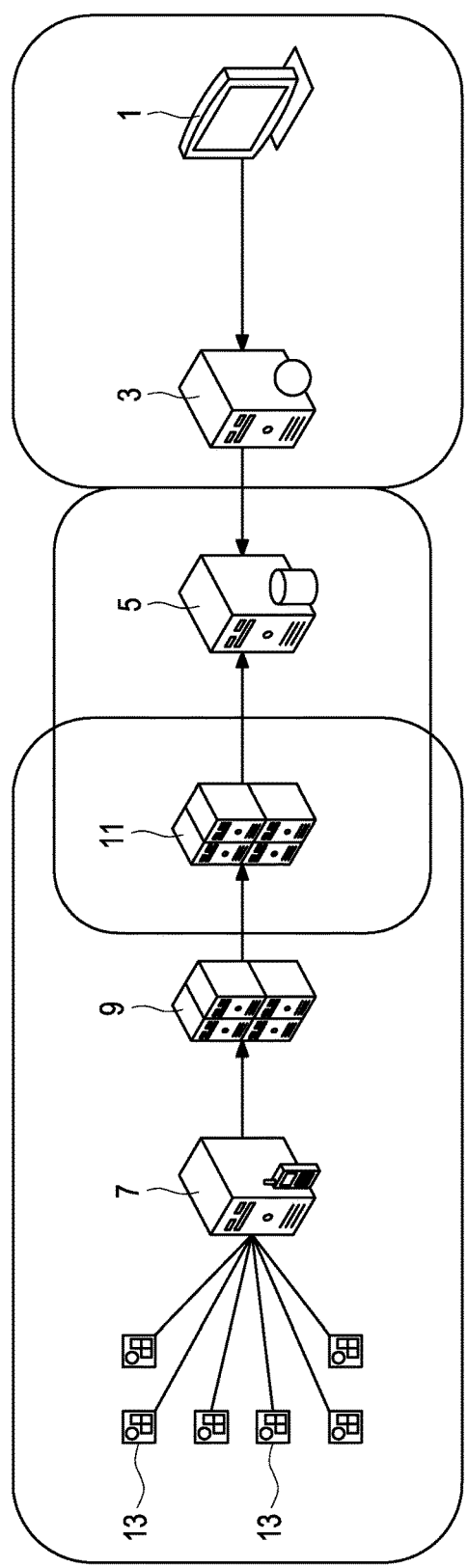
FIG. 1 shows an overview of a state of the art machine-to-machine scenario.

In FIG. 1, a machine-to-machine scenario is shown, wherein a dashboard 1 is connected to a web server 3 that provides information from the dashboard 1 to a database 5. A broker server 7 accesses the database 5 via converters 9 and analytic servers 11. The broker server 7 downloads the dashboard information and supplies a number of sensors 13 with this information as the sensors 13 access the broker server 7.

Figure 2:
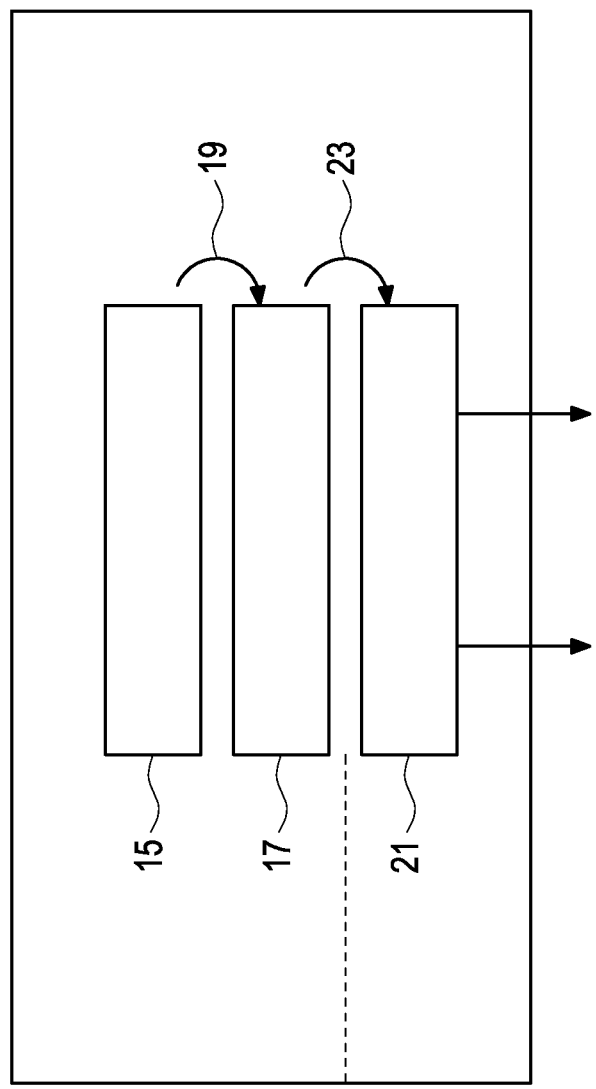
FIG. 2 shows a schematic illustration of an embodiment of a method according to an embodiment of the present invention.

The overview shown in FIG. 2 starts at a platform independent level, wherein according an embodiment of the present method, a first domain specific language 15 is used by a user to specify demands of a cloud stack to be provisioned. The specifications may be described in terms of hosting units. Based on the demands specified by the user, a model is calculated and transformed according to a grammar of a second domain specific language 17 via model-to-model transformation, as indicated by arrow 19. Based on the second domain specific language a general model of an infrastructure used to provide the cloud stack is generated with respect to the demands specified by the user. On a platform specific level, a third domain specific language 21 is used to generate a model based on the general model, as indicated by arrow 23. The third domain specific language 21 uses code generators to create output in terms of cloud-init files that are used to configure particular servers of a cloud computer network during a starting procedure.

Based on the cloud-init files, particular servers are configured with software and services specified by the user. As soon as one server is initialized, the server can be used as a Puppet master for further provisioning of services. A cloud stack built on all servers of a particular server infrastructure can be used to provide software and services to a number of workspaces that are connected to the cloud stack via a network such as the internet, for example.

In FIG. 3 grammar rules for a particular infrastructure as a service (IaaS) project 31 and a security group 33 are shown. Besides a project identifier 35 and an optional description, the service project 31 states a cost center 37 for internal service charging and a creator 39 of the service project 31. Further, security groups, volumes and servers are defined in order to provision an individualized cloud stack, according to an embodiment of the present method.

The grammar rules for the security group 33 comprise firewall rules 47 that state a protocol such as TCP, a source 49 and one or more destination ports 51. Another security group 33 needs to be referenced to a classless Inter-Domain Routing address which has to be specified for a source 49. Grammar rules for "volumes" and "servers" are defined similarly. Such grammar rules comprise further rules and capture concepts such as "images", "flavors", "CPU", "RAM" and "disk".

A respective domain specific language closely reflects concepts of a particular platform such as EC2. Thus, the respective domain specific language is rather platform-specific and constitutes a target metamodel for other domain specific languages.

A shell script 53 is shown in FIG. 4. In a first block 55 of code, public keys for all members of a project having a public key are added. A block 57 of code creates security groups and adds respective security rules for communication of servers within a particular cloud stack In FIG. 5 a script 59 of a domain specific language for a project MDE@DTAG is shown. The script 59 lists some defaults that apply to server definitions such as "flavor" or "image". The defaults are directly used from other domain specific languages by using Xtext's import statement, for example in order to create respective models, according to an embodiment of the present invention.

Rules 61 for a project are shown in FIG. 6 that resemble a definition from other domain specific languages, i.e. metadata such as the cost center 37 or members of a project. The rules 61 comprise a profile 63 and hosting units 65 with services 67. The rules 61 can use references to separately defined entities, i.e. a profile 69 and service types 71 that can be used to specify an individualized cloud stack, according to an embodiment of the present invention.

Definitions for the profile 69 and service types 71 are shown in FIG. 7. The profile 69 defines stages 73, where each stage 73 can be dedicated to a cloud 75. This is, why a production environment can be located at a different cloud region compared to where development takes place. A "hosting unit" corresponds to a server if no particular "scale" parameter is present. If not explicitly bound to one or more stages 73, servers of a hosting unit can be instantiated in all stages 73. Similarly, a service of a hosting unit can further refine its own instantiation, i.e. it can be declared as internal. In this case, no allowing security rule has to be generated for particular ports, a service type may be associated with. Finally a service type may imply other services, which permits to define transitive dependencies amongst service types.

In FIG. 8 mapping stages to security groups through an Xtend create extension 76 is shown. A list of hosting units is passed as a parameter 77 and evaluated. This is, only hosting units are considered that either are not bound to one or more stages or explicitly state a stage under consideration. For all matching hosting units, transitive services are calculated first. For all non internal services, security rules are generated. Finally, a hosting unit is transformed to servers using the mentioned list of hosting units, in order to specify an individualized cloud stack, according to an embodiment of the present invention.

In FIG. 9 a script for describing a cloud stack according to an embodiment of the present invention is shown. A project 81 comprises a hosting unit 83 simulating a sensor 85 during stages of development and test, while in production real machine-to-machine devices generate respective data. The sensor 85 hosts a first part 87 of a cloud based Proof of Concept (PoC). A broker 89 is further realized by Mosquito software. Other hosting units 91 to 97 host other services or other parts of the PoC.

Figure 10:
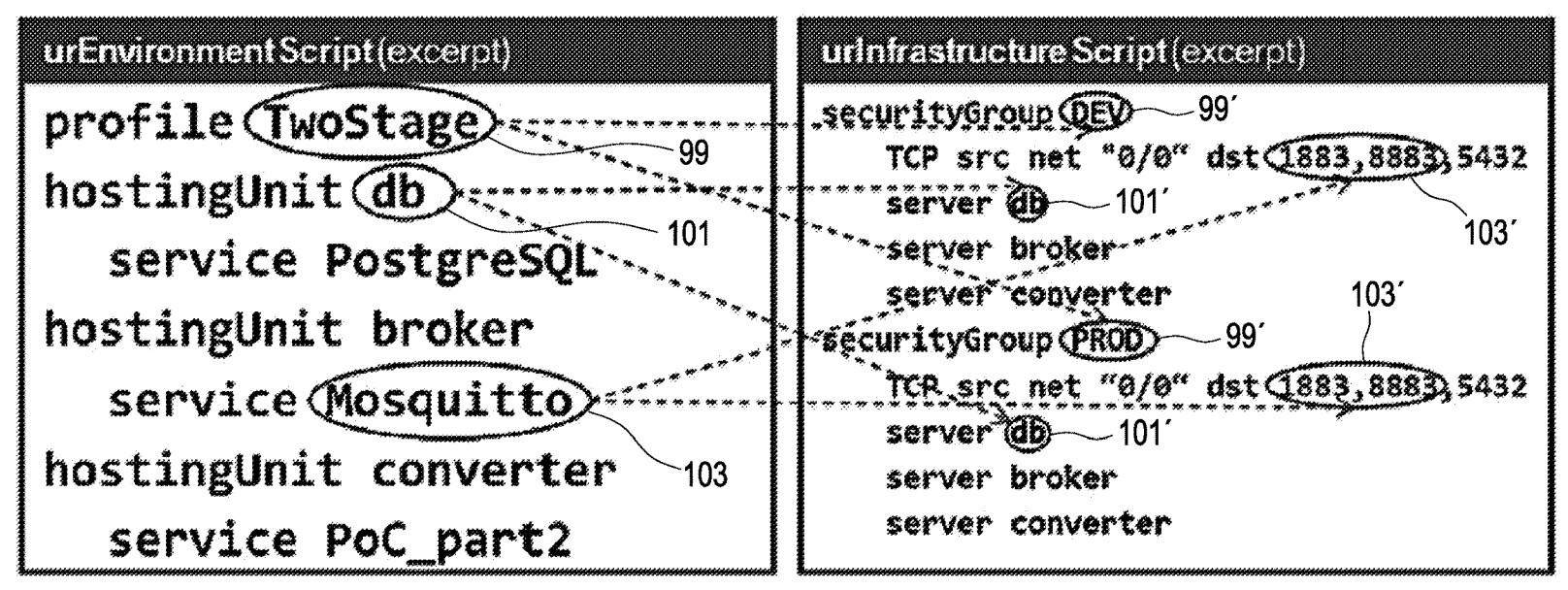

FIG. 10 shows a model transformation according to an embodiment of the present invention, wherein mapped model elements 99, 101 and 103 using textual representations 99', 101', 103' are highlighted.

We claim:

1. Method for an automatic provisioning of a customized cloud stack comprising a customized infrastructure of servers, software and services, the method comprising:
   using a number of domain specific languages, model-to-model transformations and code generators;
   wherein a first domain specific language is used to define a model of software and services to be provisioned on particular hosting units that are defined by a user;
   wherein the hosting units are mapped to a general model of the infrastructure of the customized cloud stack by an execution engine;
   wherein the general model is generated by a second domain specific language, transformed by the execution engine and mapped to a model conforming to a metamodel of a third domain specific language which is used to provision the infrastructure according to the particular hosting units defined by the first domain specific language;
   wherein compared to the third domain specific language, the second domain specific language produces more compact code;
   wherein files for initialization of a particular server within the infrastructure of servers are generated by particular code generators according to the model defined by the third domain specific language and weaved into user-data for specifying particular software and services; and
   wherein the userdata are passed when particular servers are started and wherein particular code generators are used to produce consumers of services generated by the third domain specific language for provisioning the infrastructure of the customized cloud stack as specified in respective hosting units;
   wherein a model is mapped to the general model and transformed to a respective client of a respective infrastructure service client, wherein the infrastructure service client realizes provisioning of the infrastructure of the customized cloud stack; and
   wherein the third domain specific language specifies at least one parameter of the following list of server parameters for a particular cloud stack: size of hard disc, size of random access memory, amount of processing units and number of servers.

2. The method according to claim 1, wherein an additional management server acts as a Puppet master for servers defined in the infrastructure of the customized cloud stack.

3. The method according to claim 1, wherein an additional customized cloud stack for testing or preproduction is provisioned.

4. The method according to claim 1, wherein the transformations are model-to-model transformations.

5. The method according to claim 1, wherein the transformations are model-to-text transformations.

6. The method according to claim 1, wherein the general model comprises information about particular stages, servers and services that are to be used.

7. The method according to claim 1, wherein default concepts defined in the metamodel are imported by the general model, wherein the default concepts are used to define security groups with respective firewall rules and to aggregate servers.

8. The method according to claim 1, wherein the first and/or the second and/or the third domain specific language produce output that is used to specify a particular cloud stack.

9. Server farm comprising:
a number of hardware servers, wherein at least a part of the number of hardware servers provide a number of cloud stacks that provide a number of workspaces with a specific amount of software and services and wherein the cloud stacks are provisioned as a customized cloud stack to a user according to claim 1.

* * * * *